(12) United States Patent
Kolagotla et al.

(10) Patent No.: US 7,120,781 B1
(45) Date of Patent: Oct. 10, 2006

(54) GENERAL PURPOSE REGISTER FILE ARCHITECTURE FOR ALIGNED SIMD

(75) Inventors: Ravi Kolagotla, Austin, TX (US);
David B. Witt, Austin, TX (US);
Bradley C. Aldrich, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 478 days.

(21) Appl. No.: 09/608,983

(22) Filed: Jun. 30, 2000

(51) Int. Cl.
*G06F 9/34* (2006.01)
(52) U.S. Cl. ...................................... 712/223; 711/201
(58) Field of Classification Search ................ 712/223, 712/224, 204, 201; 711/201
See application file for complete search history.

(56) References Cited

U.S. PATENT DOCUMENTS

| | | | |
|---|---|---|---|
| 4,972,260 A | 11/1990 | Fujikawa et al. | |
| 5,128,759 A | 7/1992 | Matsunaga | |
| 5,179,671 A * | 1/1993 | Kelly et al. | 712/300 |
| 5,307,321 A * | 4/1994 | Sasai et al. | 365/230.03 |
| 5,309,527 A | 5/1994 | Ohki | |
| 5,544,251 A | 8/1996 | Coelho | |
| 5,566,250 A | 10/1996 | Coelho | |
| 5,724,275 A * | 3/1998 | Chung | 708/211 |
| 5,771,368 A * | 6/1998 | Cmelik et al. | 711/200 |
| 5,922,066 A * | 7/1999 | Cho et al. | 712/204 |
| 5,933,650 A | 8/1999 | van Hook et al. | |
| 5,951,677 A | 9/1999 | Wolf et al. | |
| 5,996,057 A * | 11/1999 | Scales et al. | 712/5 |

FOREIGN PATENT DOCUMENTS

| | | |
|---|---|---|
| EP | 0 268 140 A2 | 5/1988 |
| EP | 0 524 792 | 1/1993 |
| EP | 0 552 005 | 7/1993 |
| EP | 602886 A2 * | 6/1994 |
| JP | 04-021128 | 1/1992 |
| JP | 06-131248 | 5/1994 |
| JP | 07-013762 | 1/1995 |
| JP | 11-312085 | 11/1999 |

OTHER PUBLICATIONS

Microsoft. Computer Dictionayr: The Comprehensive Standard for Business, School, Library, and Home. Second Edition. Microsoft Press®: Redmond, Washington ©1994. pp. 121-122.*
Heuring, Vincent P. and Jordan, Harry F. Compuetr Systems Design and Architecture. Reading, Mass.: Addison Wesley Longman, Inc., ©1997. pp. 98-99, 184, and 497-499.*
Kubo, Masanori (Japan Patent Office), Japanese Patent Application No. 2001-201406, Decision of Refusal, Feb. 7, 2006, 2 pages.

(Continued)

*Primary Examiner*—Eddie Chan
*Assistant Examiner*—Aimee J. Li
(74) *Attorney, Agent, or Firm*—Fish & Richardson P.C.

(57) ABSTRACT

A register file architecture in a general purpose digital signal processor (DSP) supports alignment independent SIMD (Single Instruction/Multiple Data) operations. The register file architecture includes a register pair and an alignment multiplexer. Two 32 bit grouped words may be loaded into the register pair. Each grouped word includes four 8 bit operands. The alignment state of the 32 bit words may be determined by the two least significant bits (LSBs) of the pointer addresses of the grouped words. These LSBs are used to control the alignment MUX to select n operands from the two 32 bit grouped words and output an aligned 32 bit grouped word to execution units for parallel processing.

35 Claims, 8 Drawing Sheets

OTHER PUBLICATIONS

Kubo, Masanori (Japan Patent Office), Japanese Patent Application No. 2001-201406, Decision of Refusal, Feb. 7, 2006, 2 pages, English translation (not an offical translation).
Patent Abstracts of Japan, Japanese Publication No. 06-131248, 2 pages.
Publication No. JP06-131248, Machine translation of the Claims and Detailed Description, 8 pages (not an official translation).
Patent Abstracts of Japan, Japanese Publication No. 04-021128, 2 pages.

* cited by examiner

GENERAL PURPOSE REGISTER FILE ARCHITECTURE FOR ALIGNED SIMD

BACKGROUND

Digital signal processors (DSPs) may be used for a variety of multimedia applications such as digital video, imaging, and audio. DSPs can manipulate the digital signals to create and open such multimedia files.

DSPs may operate as SIMD (Single Instruction/Multiple Data), or data parallel, processors. In SIMD operations, a single instruction is sent to a number of processing elements, which perform the same operation on different data. A central controller may be used to broadcast the instruction stream to the different processing elements. SIMD instructions provide for several types of standard operations including addition, subtraction, multiplication, multiply-accumulate (MAC), and a number of special instructions for L1-Norm-accumulate (SAA), clipping, and bilinear interpolation.

Many video and image processing devices operate on 8 bit words arranged in a two dimensional (2D) data array. Four 8 bit operands may be packed into a 32 bit grouped word to be sent to the execution units for parallel processing. These 8 bit operands from the 2D array must be properly aligned in the 32 bit grouped word for proper operation.

When working with 8 bit data on a 32 bit word aligned machine, four different alignment possibilities may exist: aligned; shifted 8 bits; shifted 16 bits; and shifted 24 bits. If the DSP detects a misaligned word, it may generate an exception. In response to the exception, an alignment operation may be performed at the memory interface or in data registers to shift the 8 bit operands to produced an aligned 32 bit word. However, this alignment operation may introduces additional processing overhead into the operation of the machine.

Alignment overhead for 8 bit SIMD operations may result in inefficient utilization of resources within a general purpose DSP. Often this inefficiency will manifest itself as unnecessary cycle consumption due to alignment operations applied to prepare the data for processing.

BRIEF SUMMARY OF THE INVENTION

A register file architecture in a general purpose digital signal processor (DSP) supports alignment independent SIMD (Single Instruction/Multiple Data) operations. The register file architecture includes a register pair and an alignment multiplexer. Two 32 bit grouped words may be loaded into the register pair. Each grouped word includes four 8 bit operands. The alignment state of the 32 bit words may be determined by the two least significant bits (LSBs) of the pointer addresses of the grouped words. These LSBs are used to control the alignment MUX to select n operands from the two 32 bit grouped words and output an aligned 32 bit grouped word to execution units for parallel processing.

BRIEF DESCRIPTION OF THE DRAWINGS

Like reference symbols in the various drawings indicate like elements.

DETAILED DESCRIPTION

Figure 1:
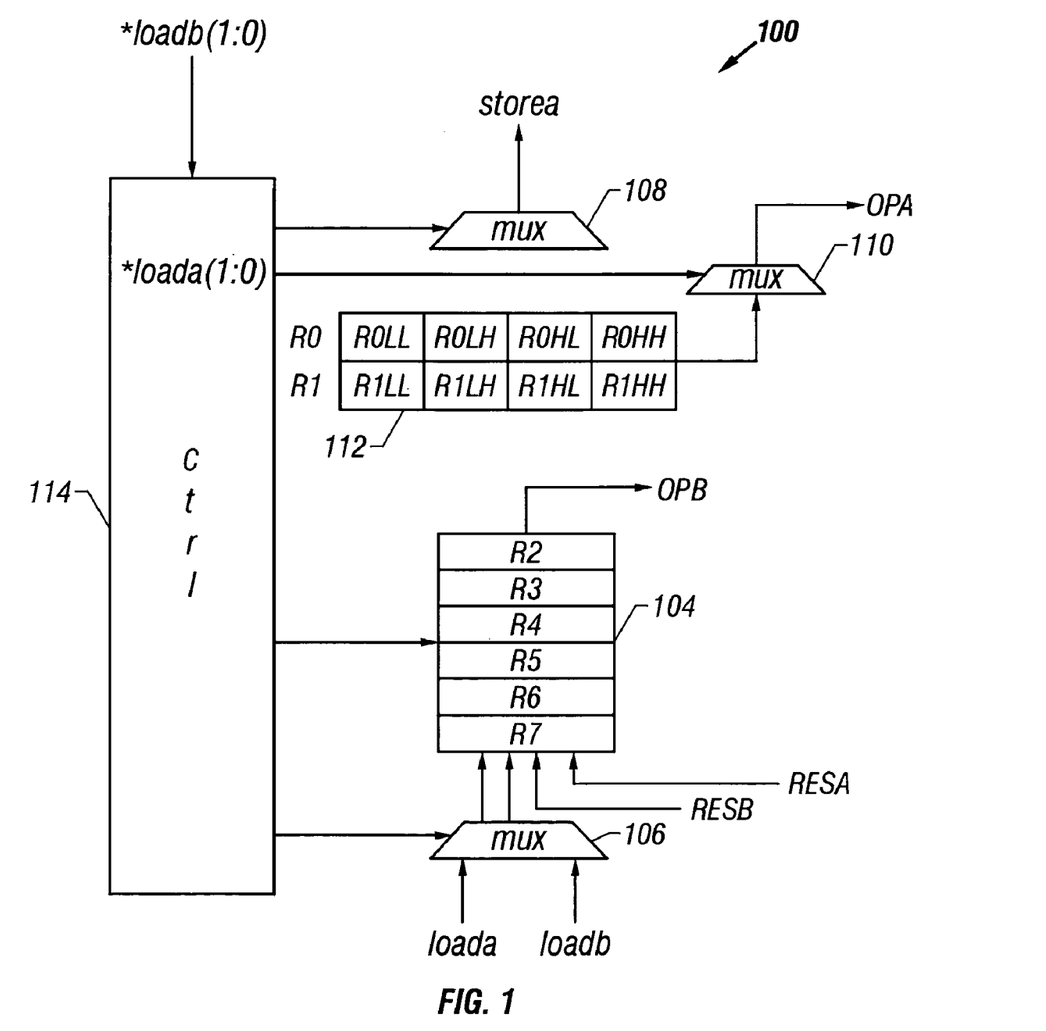
FIG. 1 is a schematic diagram of a register file architecture according to an embodiment.

FIG. 1 illustrates a register file architecture 100 according to an embodiment that provides automatic alignment of 32 bit grouped words using the address pointers to two dimensional (2D) packed 8 bit data arrays. The register file includes a number of registers R0-R7 104. A load multiplexer (MUX) 106 multiplexes 32 bit loads into the register file, a store MUX 108 outputs a store word from the register file, and an alignment MUX 110 outputs an aligned 32 bit grouped word from a register pair 112 including registers R0 and R1. The alignment MUXs 110 and register file are controlled by a control unit 114.

Figures 2A, 2B, 2C, 2D:
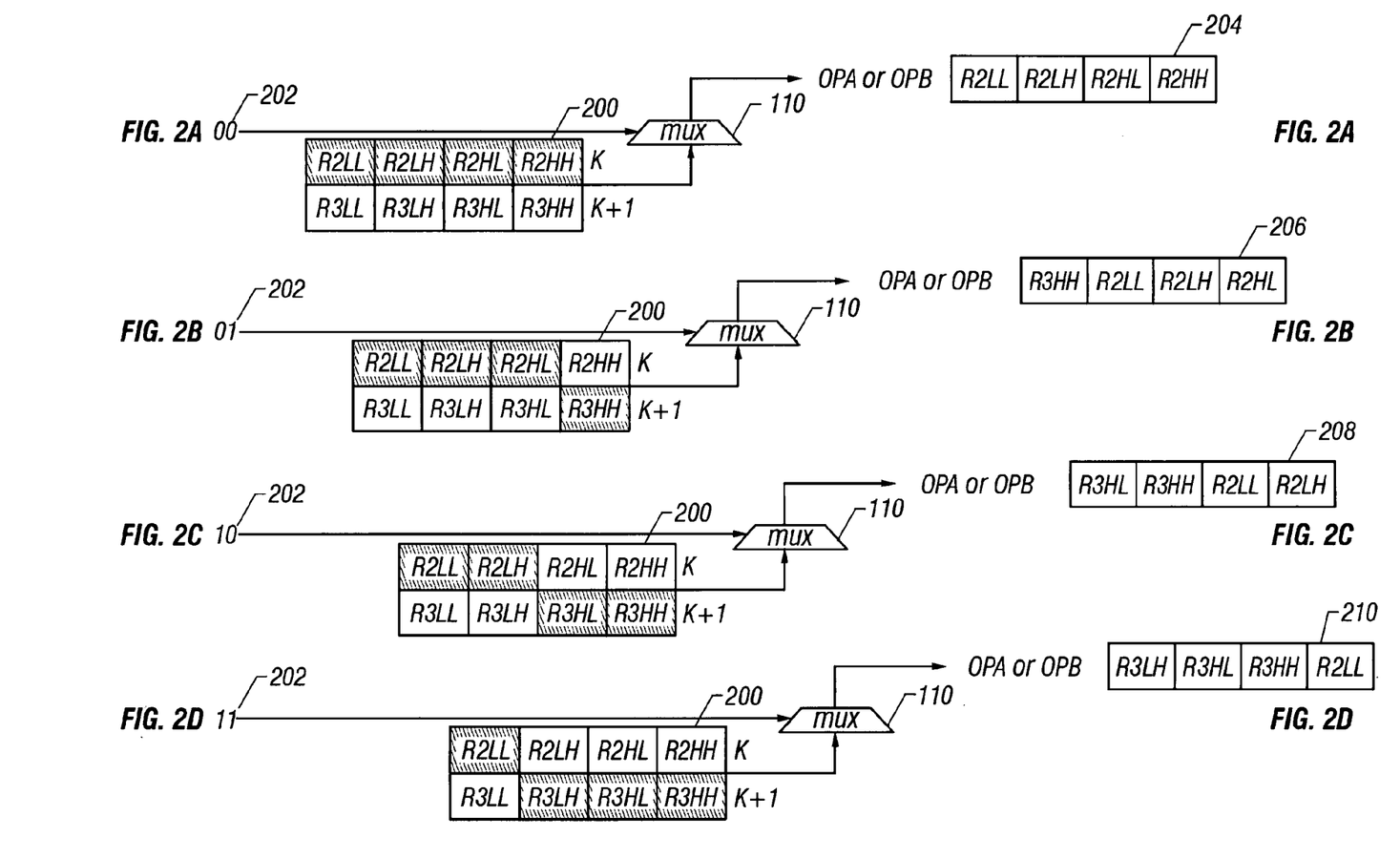
FIGS. 2A–2D illustrate a register file architecture according to an embodiment operating on 32 bit loads in four alignment states.

The register file is primed for an alignment operation by loading two 32 bit grouped words, k and k+1 from the data array into each of one of the data registers in the register pair, R0 and R1, respectively. Each 8 bit operand occupies one of four memory locations in the register, RxLL, RxLH, RxHL, and RxHH. FIGS. 2A–2D show four different alignment cases for the 32 bit words in a register pair 200 including registers R2 and R3. The four 8 bit operands may be properly aligned (FIG. 2A) or may cross 32 bit word boundaries (FIGS. 2B–2D).

The two least significant bits (LSB) 202 of the pointer addresses are masked off by the control unit and used to determine the state of alignment for the 32 bit grouped word. These LSBs 202 are used as control signals to control the alignment MUX 110 to select the four 8 bit operands from the eight memory locations in the register pair that correspond to an aligned 32 bit word 204. The aligned 32 bit word 202 may be output as an operand (OPA or OPB) for parallel processing of its component 8 bit operands by the execution units.

As shown in FIG. 2A, "00" indicates an aligned word. In this case, the alignment MUX 110 is controlled to select the operands in R2LL, R2LH, R2HL, and R2HH, and output, in that order, an aligned 32 bit word 204 containing those 8 bit operands.

As shown in FIG. 2B, "01" indicates a 32 bit words offset by 8 bits. In this case, the alignment MUX 110 is controlled to select the operands in R3HH, R2LL, R2LH, and R2HL, and output, in that order, an aligned 32 bit word 206 containing those 8 bit operands.

As shown in FIG. 2C, "10" indicates a 32 bit words offset by 16 bits. In this case, the alignment MUX 110 is controlled to select the operands in R3HL, R3HH, R2LL, and R2LH, and output, in that order, an aligned 32 bit word 208 containing those 8 bit operands.

As shown in FIG. 2D, "11" indicates a 32 bit words offset by 24 bits. In this case, the alignment MUX 110 is controlled to select the operands in R3LH, R3HL, R3HH, and R2LL, and output, in that order, an aligned 32 bit word 210 containing those 8 bit operands.

Figure 3A:
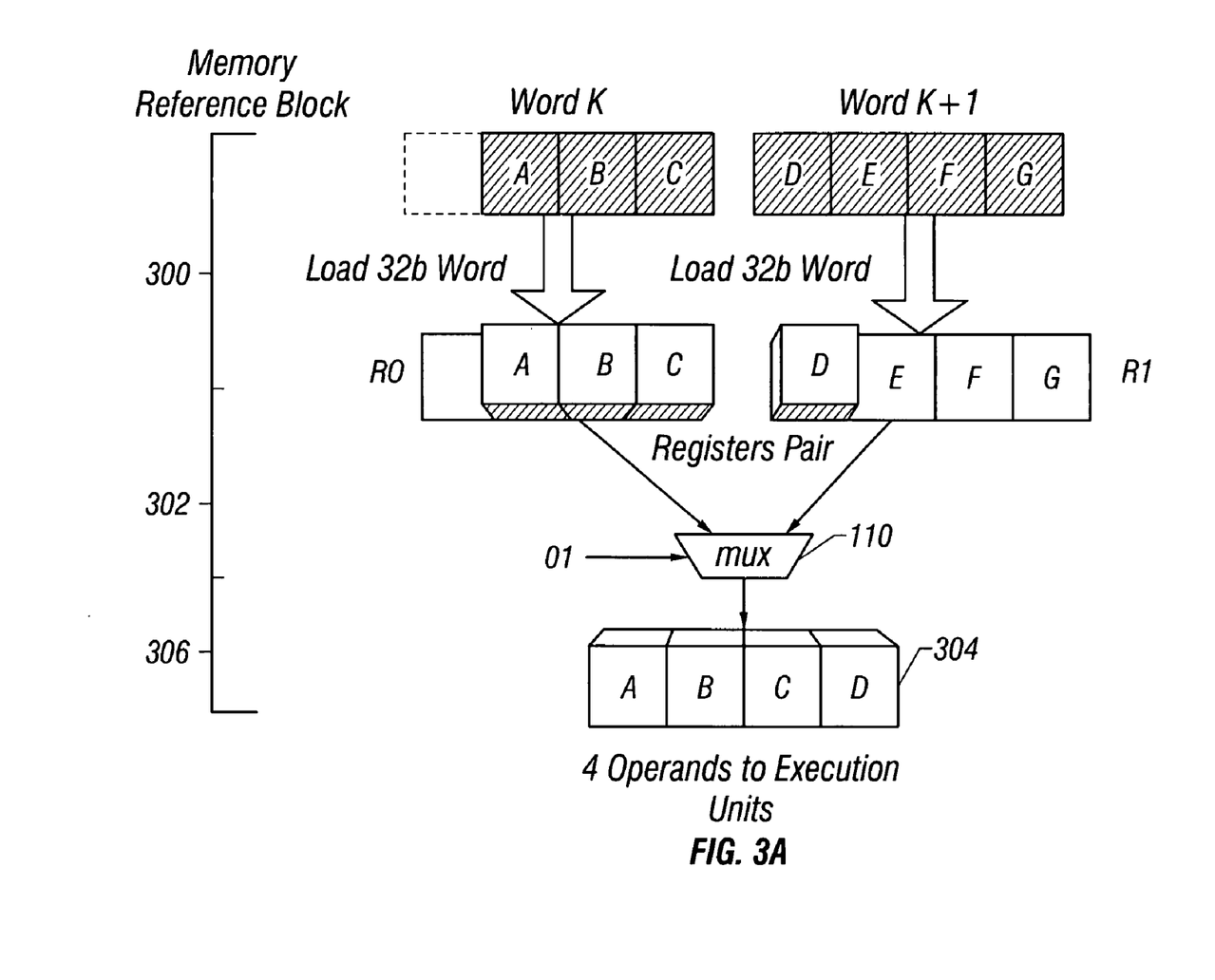
FIGS. 3A–3C illustrate an alignment operation according to an embodiment.
Figure 3B:
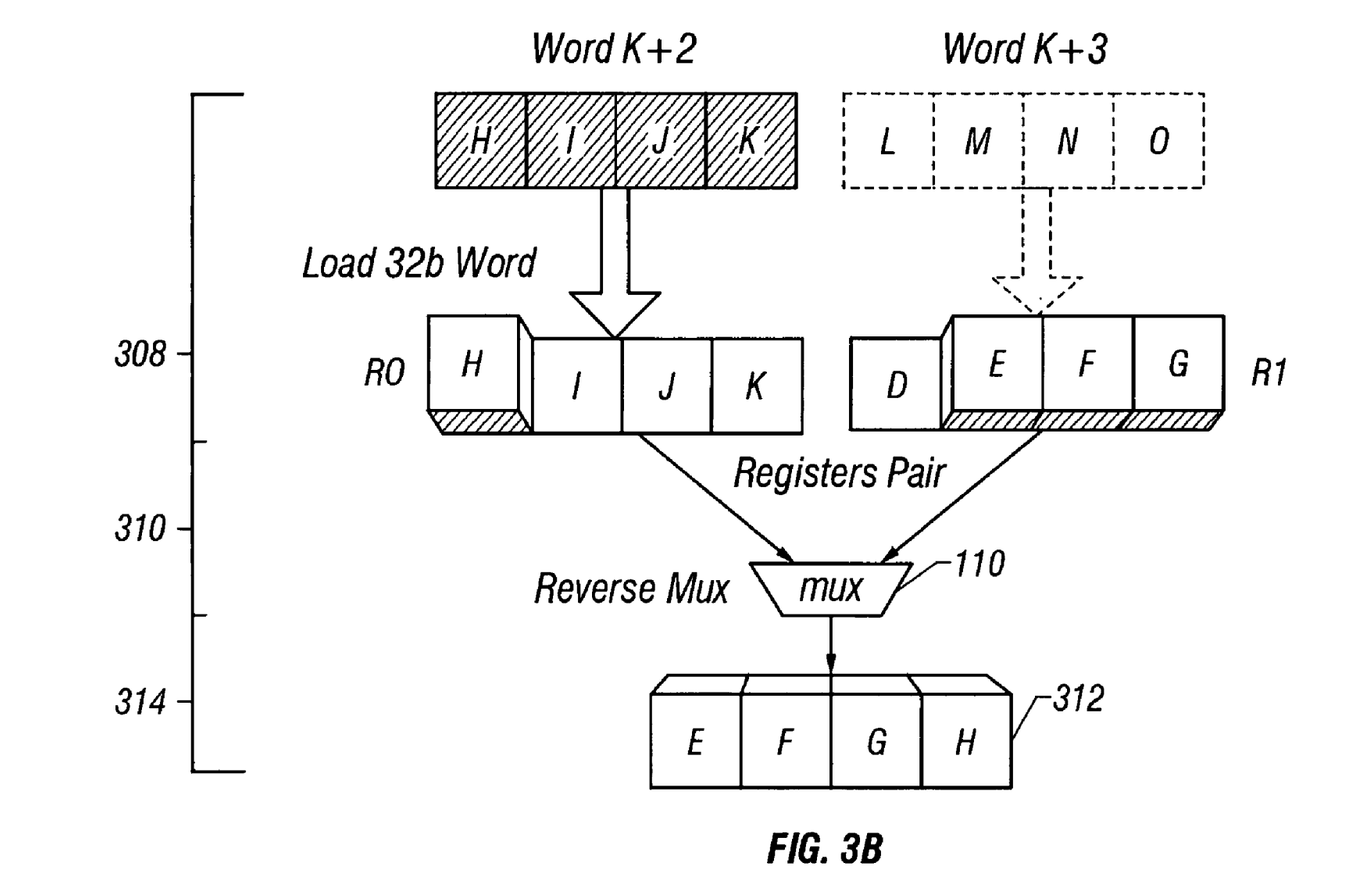
Figure 3C:
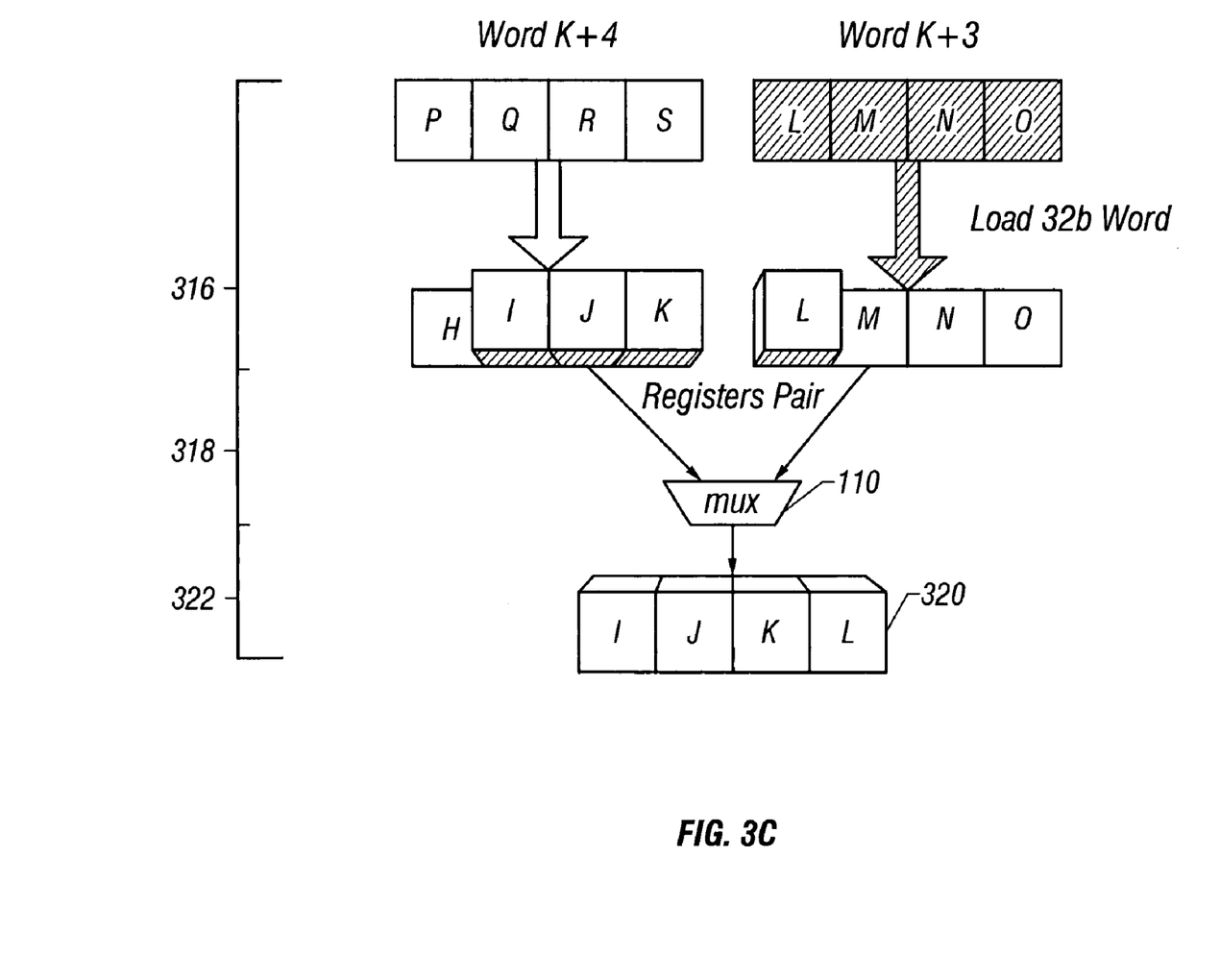

FIGS. 3A–3C illustrate an alignment operation according to an embodiment. The operation is primed (in cycle 1) by loading registers R0 and R1 in state 300 with misaligned 32 bit words k and k+1 from the 2D data array, as shown in FIG.

3A. Word k contains 8 bit operands A, B, and C, and word k+1 includes 8 bit operands D, E, F, and G. In this instance, words k and k+1 are offset by 8 bits. The LSBs of the pointer addresses for these words are "01". Accordingly, alignment MUX 110 selects 8 bit operands A, B, C from register R0, and operand D from register R1 in state 302 and outputs aligned 32 bit word ABCD 304 in state 306. Once primed, there is only one load required per cycle. As shown in FIG. 3B, in the subsequent cycle (cycle 2), register R0 is loaded with 32 bit word k+2, HIJK, in state 308. The alignment MUX 110 is controlled to reverse multiplex the operands in the register pair to obtain a reflection of the readout. When reverse multiplexing the operands, the alignment MUX reads out register R1 before register R0. The alignment MUX selects previously unselected 8 bit operands E, F, and G from register R1, and operand H from register R0 in state 310. The alignment MUX outputs aligned 32 bit word EFGH 312 in state 314 for processing.

In the next cycle (cycle 3), R1 is loaded with 32 bit word k+3, LMNO, 316. The alignment MUX 110 is controlled to select bytes I, J, K, and L in state 318 and output 32 bit word IJKL 320 in state 322. In cycle 3, the alignment MUX 110 forward multiplexes registers R0 and R1. Thus, the 32 bit loads are "ping-ponged" between the two registers R0 and R1 in the pair each even/odd cycle while processing the packed 8 bit array.

As illustrated in the operation shown in FIGS. 3A–3C, the processing requirements of 8 bit data is often repetitive and once established, holds constant. Once the register file is primed, the 32 bit loads are aligned with a minimum of overhead.

Loading a data register with a misaligned 32 bit word in a general purpose DSP may cause the generation of an exception. Eight bit SIMD operations may require as many as sixteen 8 bit operands to be available to the execution units. This corresponds to two register pairs, i.e., four registers. With two 32 bit busses available for loading the register pairs, the four registers must loaded prior to initiating the SIMD operation. According to an embodiment, a special instruction, e.g., DISALGENEX, may be used while priming the function to disable the generation of exceptions due to misaligned access while priming the 8 bit SIMD function loops. The DISALGENEX instruction may be issued in combination with one or two load operations which may or may not cross 32 bit boundaries. Some instruction examples include:

(1) DISALGENEX, R1=[i0++], R3=[I1++];
(2) DISALGENEX, [p0++p1]=R5, R3=[I1++];

Returning to FIG. 1, the control unit 114 may control the load MUX 106 to load the register pair R0/R1 with adjacent 32 bit grouped words corresponding to load A. The control unit also controls load MUX 106 to load register R2 with a 32 bit grouped word corresponding to load B. The two LSBs 202 of the pointer address for load A (*loada[1:0]) are masked off by the control unit and input as control signals to the alignment MUX 110. The alignment MUX selects the appropriate four operands based on the LSBs of the pointer address of load A to output an aligned 32 bit word, OPA. R2 outputs 32 bit grouped word OPB. The 8 bit operands in OPA and OPB are operated on by execution units. Results RESA and RESB from these operations may be reloaded into the register file.

Figure 4:
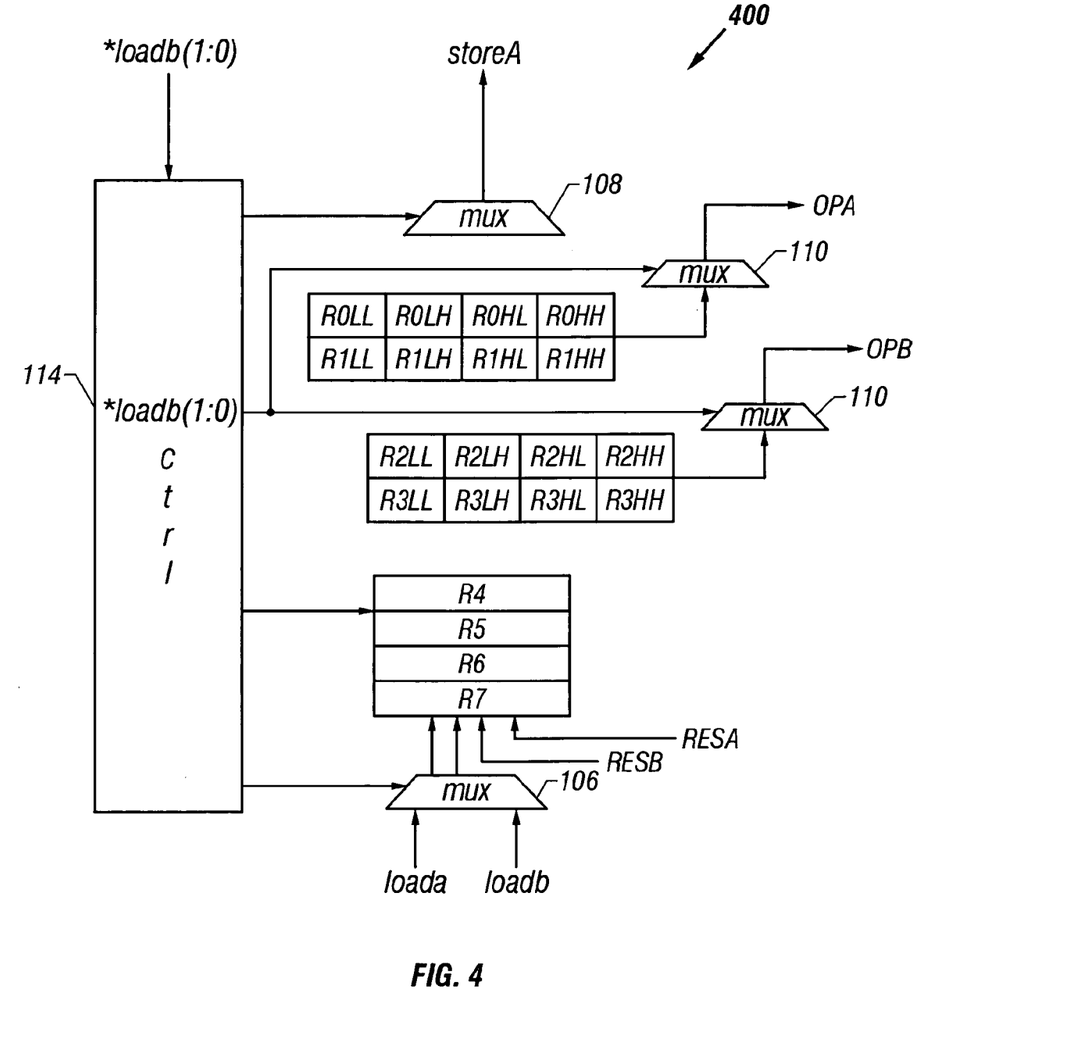
FIG. 4 illustrates a register file architecture according to another embodiment including two register pairs.
Figure 5:
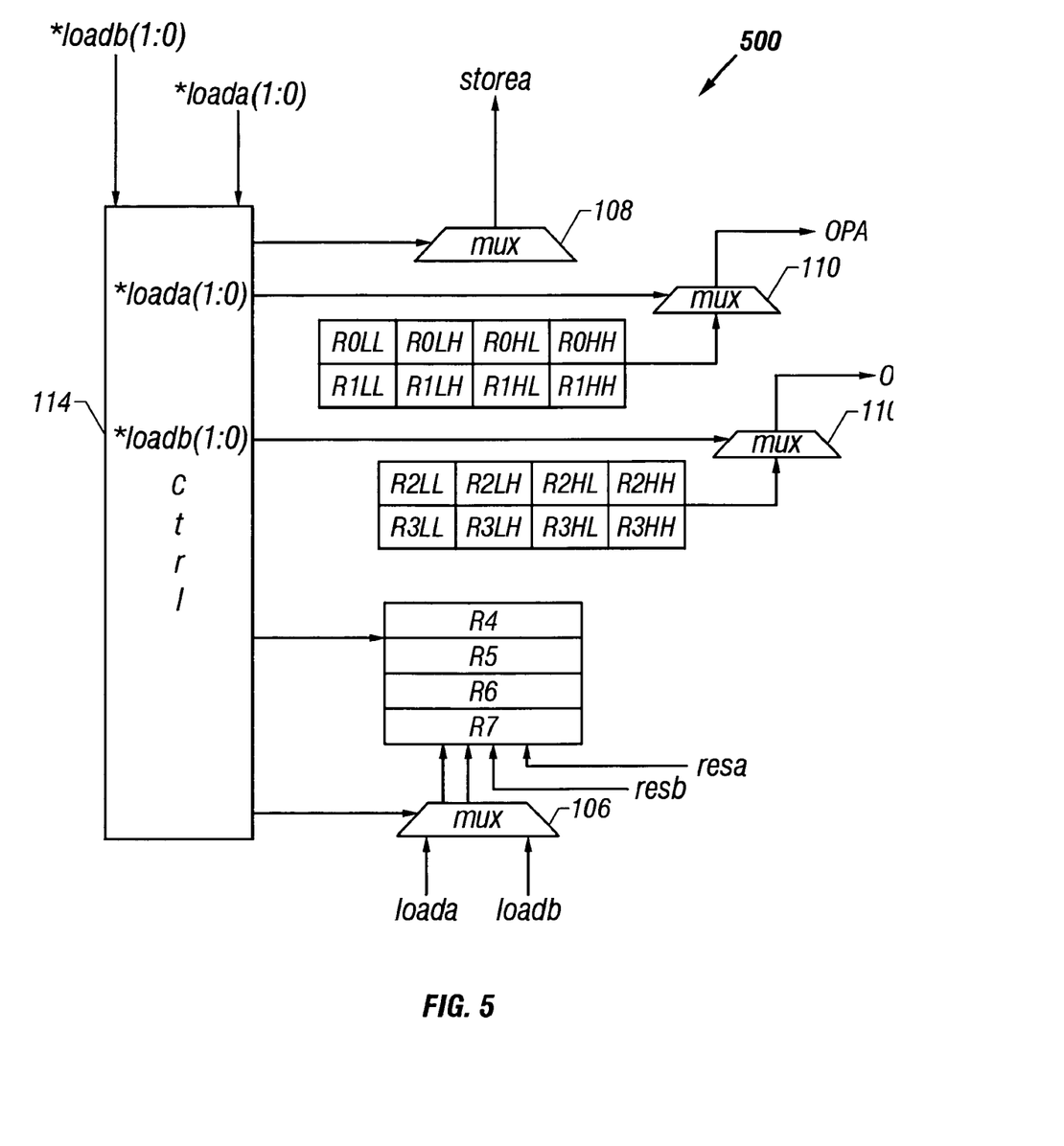
FIG. 5 illustrates a register file architecture according to yet another embodiment including two register pairs.

FIG. 4 illustrates a register file architecture 400 according to an embodiment in which the LSBs from a single pointer address (*loadb[1:0]) may be used to multiplex eight 8 bit operands from two register pairs, R0/R1 and R2/R3, to output two aligned 32 bit words, OPA and OPB. This allows the second pointer to be used for store operations. According to this embodiment, 8 bit SIMD instructions may be supported by allowing alignment independent execution of instructions intended to operate on adjacent rows or columns in a 2D 8 bit data array. An instruction which supports this type of alignment may have the form:

dregs=8b_OP(R1:0,R3:2)AMOD, [$i_m$++]=dregs, dregs= [$i_m$++];

FIG. 5 illustrates a register file architecture 500 according to an embodiment in which the two LSBs from each of two pointers, $i_m$ and $i_n$, for the 8 bit packed data arrays are used as control signals for multiplexing eight 8 bit operands. This is intended to provide two 32 bit grouped words to the execution units where the alignment of each may be different. Two alignment MUXs 110 are provided, each provided with the LSBs of a different pointer as a control signal.

An instruction which support this type of alignment may have the form:

dregs=8b_OP(R1:0, R3:2)AMOD, dregs=[$i_m$ ++], dregs= [$i_m$++]; and
dregs=8b_OP(R1:0, R3:2)AMOD, dregs=[$i_n$ ++], dregs= [$i_n$++];

An alignment independent 8 bit SIMD ADD operation may be performed according to an embodiment. Quad 8 bit SIMD instructions are used to perform two byte additions with four 16 bit signed data outputs. Thirty-two bit load OPA includes four 8 bit operands $a_{m+3}$, $a_{m+2}$, $a_{m+1}$, and $a_m$. Thirty-two bit load OPB includes four 8 bit operands $b_{m+3}$, $b_{m+2}$, $b_{m+1}$, and $b_m$. The two 32 bit grouped words used to determine OPA may be loaded on register pair R0/R1, and the 32 bit grouped words used to determine OPB may be loaded on register pair R2/R3. The corresponding 8 bit operands of OPA and OPB are added. The results of the addition operation are four 16 bit values, $a_{m+3}+b_{m+3}$, $a_{m+2}+b_{m+2}$, $a_{m+1}+b_{m+1}$, and $a_m+b_m$, that may be grouped into 32 bit words and stored in two destination registers selected from R4, R5, R6, and R7.

The instructions for performing the alignment independent 8 bit SIMD ADD operation may have the form:
(dregs, dregs)=q2badd (dreg_pair, dreg_pair);
(dregs, dregs)=q2badd (dreg_pair, dreg_pair)R;
  Example instructions include:
  (r4, r5)=q2badd (r1:0, r3:2);
  (r5, r4)=q2badd (r1:0, r3:2)R.

These instructions assume that the loads are always on the 32 bit boundary and that the two pointers are stored in I0 and I1. These values are valid for 8 bit boundaries, however loads actually occur on 32 bit boundaries. The two LSBs from the pointers i0 and i1, are decoded to select one of the four possible alignment cases from register pairs R0/R1 and R2/R3, respectively. The register containing word k+1 is considered to be in registers R0 and R2 in the default, and the word k+2 is considered to be in registers R1 and R3.

The "R" option specifies that the reflection of the read out should be performed, as described above in connection with FIG. 3B. This allows effective ping-ponging between the registers in each pair while executing an array processing function.

The above-described alignment independent SIMD ADD operation may be used to support a number of image based calculations. Other alignment independent SIMD operations may be performed according to various embodiments, including, for example, subtraction, multiplication, multiply-accumulate (MAC) and a number of special instructions for L1-Norm-accumulate (SAA), clipping, and bilinear interpolation.

Depending on the desired SIMD operation, different methods of alignment may be used for 32 bit grouped words. The 8 bit case has been described above, with four different alignment cases. Sixteen bit data may also grouped into 32 bit loads. Such loads will have two alignment cases, aligned and misaligned, in which the 16 bit operands are shifted by 16 bits. The two LSBs of the pointer address for the load may be used to determine the alignment case, for example, "00" for the aligned case, and "01" for the misaligned case. Another case may be generalized for SIMD operations which operate on mixed data types, for example, 32 bit grouped words containing mixed 8 bit and 16 bit operands.

A register file architecture according to an embodiment may provide higher throughput for a variety of video and imaging algorithms by eliminated the need to pre-process data for the various alignment operations. This may reduce code size by eliminating similar routines in the code intended to handle the different alignment situations and also improve cycle count by eliminating the need for detecting the alignment state and subsequent branching to the appropriate sequence of instructions. Thus, the register file architecture may provide for alignment of data on 8 bit boundaries within the execution units without burdening the memory interface, which may be reserved for 32 bit load/store operations.

The embodiments described above which support alignment independent SIMD operations are particularly well suited to operations intended to support video and image based processing. These include, for example, 8 bit quad interpolation for half X, half Y, and half XY, fractional motion search operations, and motion compensation.

A general purpose DSP including a register file architecture according to the various embodiments may be well suited for use in video processing imaging equipment which utilize MPEG-1/MPEG-2/MPEG-4/H.263 future standards for video compression.

Figure 6:
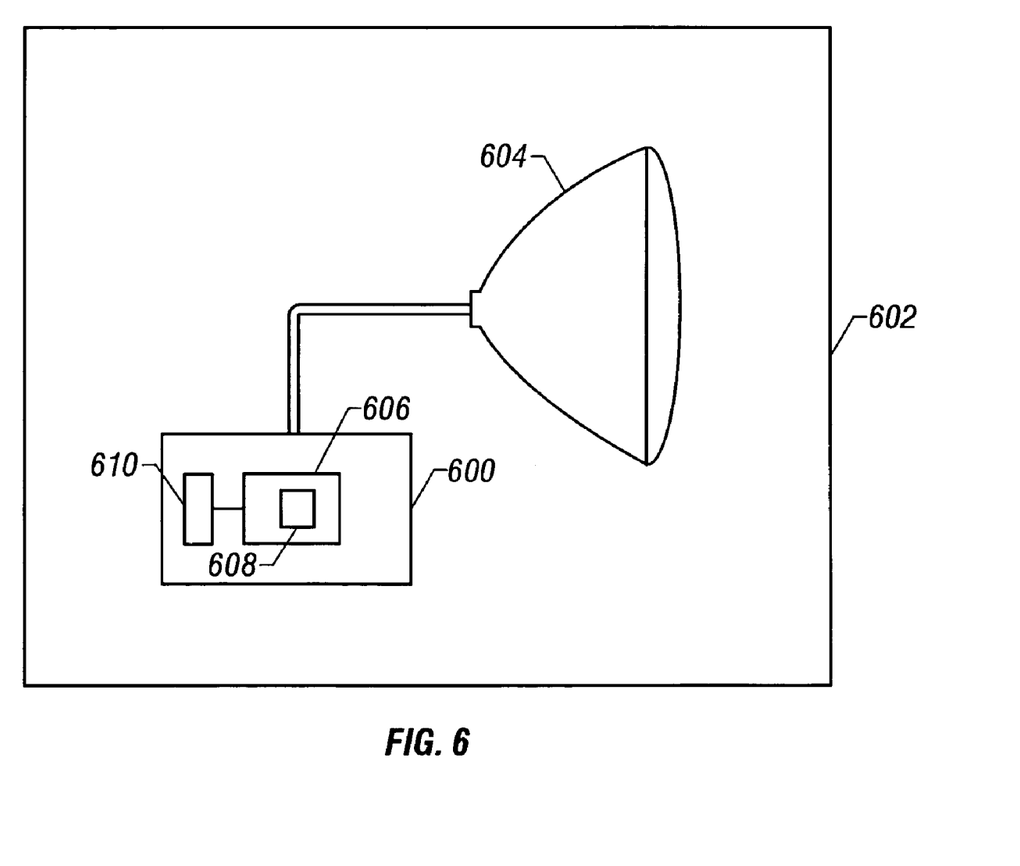
FIG. 6 is a schematic diagram of a high definition television incorporating a digital signal processor with a register file architecture according to an embodiment.

Such a general purpose DSP is contemplated for use in video camcorders, digital cameras, teleconferencing, PC video cards, and HDTV. As shown in FIG. 6, a video processor 600 for an HDTV 602 with a display screen 604 may include a DSP 606 including a register file architecture 608 according to an embodiment and a memory 610 for storing instructions for performing video processing operations. In addition, the general-purpose DSP is also contemplated for use in connection with other technologies utilizing digital signal processing such as voice processing used in mobile telephony, speech recognition, and other applications.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a register pair adapted to store two grouped words comprising in aggregate up to 2n operands, the register pair including a first register and a second register;
   a control unit operative to:
      prime the apparatus for aligning a plurality of grouped words in a data array by loading first and second grouped words from said plurality of grouped words into the register pair and determining an alignment state of at least one of said first and second grouped words in a first alignment operation; and
      load a next one of said plurality of grouped words into one of said first and second registers in each of a plurality of subsequent alignment operations and
   an operand selector adapted to select n operands from the two grouped words in said register pair and output an aligned grouped word comprising said n operands in response to a control signal indicative of the alignment state of said two grouped words in each of the first and said subsequent alignment operations,
   wherein
      the operand selector is connected to one or more execution units such that the aligned group word is output from the operand selector directly to the execution units, and
      in each of the subsequent alignment operations, the control unit loads only one grouped word from said plurality of grouped words into the register pair and the operand selector outputs one aligned grouped word from said register pair.

2. The apparatus of claim 1, wherein said operand selector is a multiplexer.

3. The apparatus of claim 1, wherein the control signal comprises the two least significant bits of a pointer address of one of said two grouped words.

4. The apparatus of claim 1, wherein each of the two grouped words and the aligned grouped word comprise 32 bit words.

5. The apparatus of claim 1, wherein n equals 4.

6. The apparatus of claim 1, wherein said n operands comprise 8 bit words.

7. The apparatus of claim 1, wherein said n operands comprise 16 bit words.

8. The apparatus of claim 1, further comprising:
   a second register pair adapted to store a second set of two grouped words comprising 2n operands,
   wherein said operand selector is adapted to select n operands from said second register pair and output a second aligned grouped word comprising said n operands in response to a control signal indicative of an alignment state of said first set of two grouped words.

9. The apparatus of claim 1, further comprising:
   a second register pair adapted to store a second set of two grouped words comprising 2n operands,
   wherein said operand selector is adapted to select n operands from said second register pair and output a second aligned grouped word comprising said n operands in response to a control signal indicative of an alignment state of said second set of two grouped words.

10. The apparatus of claim 1, wherein in the subsequent alignment operations, the operand selector selects said n operands and outputs said aligned grouped word without receiving a control signal from the control unit indicating an alignment state of either grouped word in the register pair.

11. The apparatus of claim 1, wherein the operand selector is operative to:
   forward multiplex operands in the register pair in the first alignment operation and odd-numbered subsequent alignment operations; and
   reverse multiplex operands in the register pair in even-numbered subsequent alignment operations.

12. The apparatus of claim 1, wherein the control unit is operative to disable the generation of exceptions due to misaligned access in the first alignment operation.

13. The apparatus of claim 1, wherein the first alignment operation comprises:
    execution of instructions to load the first and second grouped words, and
    execution of instructions that generate the aligned grouped word.

14. The apparatus of claim 1, wherein the control signal is generated as part of execution of at least one of an instruction that loads the first grouped word, an instruction that loads the second grouped word, an instruction that loads both the first and second grouped words, or an instruction that generates the aligned group word.

15. A video processor comprising:
    a memory to store instructions to perform video processing operations;
    a digital signal processor comprising:
    a register pair adapted to store two grouped words comprising in aggregate up to 2n operands, the register pair including a first register and a second register;
    a control unit operative to:
        prime the apparatus for aligning a plurality of grouped words in a data array by loading first and second grouped words from said plurality of grouped words into the register pair and determining an alignment state of at least one of said first and second grouped words in a first alignment operation; and
        load a next one of said plurality of grouped words into one of said first and second registers in each of a plurality of subsequent alignment operations; and
    an operand selector adapted to select n operands from the two grouped words in said register pair and output an aligned grouped word comprising said n operands in response to a control signal indicative of the alignment state of said two grouped words in each of the first and said subsequent alignment operations,
    wherein
        the operand selector is connected to one or more execution units such that the aligned group word is output from the operand selector directly to the execution units, and
        in each of the subsequent alignment operations, the control unit loads only one grouped word from said plurality of grouped words into the register pair and the operand selector outputs one aligned grouped word from said register pair.

16. The video processor of claim 15, wherein the control signal comprises the two least significant bits of a pointer address of one of first and second grouped words.

17. The video processor of claim 15, wherein each of the first grouped word, second grouped word and the aligned grouped word comprise 32 bit words.

18. The video processor of claim 15, wherein n equals 4.

19. The video processor of claim 15, wherein said n operands comprise 8 bit words.

20. The video processor of claim 15, wherein said n operands comprise 16 bit words.

21. The video processor of claim 15, wherein in the subsequent alignment operations, the operand selector selects said n operands and outputs said aligned grouped word without receiving a control signal from the control unit indicating an alignment state of either grouped word in the register pair.

22. The video processor of claim 15, wherein the operand selector is operative to:
    forward multiplex operands in the register pair in the first alignment operation and odd-numbered subsequent alignment operations; and
    reverse multiplex operands in the register pair in even-numbered subsequent alignment operations.

23. The video processor of claim 15, wherein the control unit is operative to disable the generation of exceptions due to misaligned access in the first alignment operation.

24. A method comprising:
    loading a first grouped word comprising n operands into a register pair;
    loading a second grouped word comprising n operands into the register pair;
    determining an alignment state of said first and second words;
    selecting n operands from the 2n operands in the first and second grouped words in the register pair in response to the determined alignment state, the n operands selected by an operand selector;
    outputting from the operand selector directly to one or more execution units an aligned grouped word comprising n operands;
    loading a third grouped word comprising n operands;
    selecting n operands from the 2n operands in the second and third grouped words in response to the determined alignment state; and
    outputting from the operand selector directly to the execution units a second aligned grouped word comprising n operands.

25. The method of claim 24, wherein determining the alignment state comprises determining the two least significant bits of one of said first and second grouped words.

26. The method of claim 24, wherein said first and second grouped words are adjacent words in a data array.

27. The method of claim 26, wherein selecting n operands comprises selecting n adjacent operands in said first and second grouped words.

28. The method of claim 24, wherein selecting n operands comprises reverse multiplexing n operands between the second and third grouped words.

29. The method of claim 24, wherein each of the two grouped words and the aligned grouped word comprise 32 bit words.

30. The method of claim 24, wherein said n operands comprise 8 bit words.

31. An apparatus, including instructions residing on a machine-readable medium, for use aligning operands in a grouped word, the instructions causing the machine to:
    load a first grouped word comprising n operands into a register pair;
    load a second grouped word comprising n operands into the register pair;
    determine an alignment state of said first and second words;
    select n operands from the 2n operands in the first and second grouped words in the register pair in response to the determined alignment state, the n operands selected by an operand selector;
    output from the operand selector directly to one or more execution units an aligned grouped word comprising n operands;
    load a third grouped word comprising n operands;
    select n operands from the 2n operands in the second and third grouped words in response to the determined alignment state; and
    output from the operand selector directly to the execution units a second aligned grouped word comprising n operands.

32. The apparatus of claim 31, wherein the instructions that cause the machine to determine the alignment state further comprise instructions that cause the machine to determine the two least significant bits of one of said first and second grouped words.

33. The apparatus of claim 31, wherein said first and second grouped words are adjacent words in a data array.

34. The apparatus of claim 33, wherein the instructions that cause the machine to select n operands further comprise instructions that cause the machine to select n adjacent operands in said first and second grouped words.

35. The apparatus of claim 31, wherein the instructions that cause the machine to select n operands further comprise instructions that cause the machine to reverse multiplex n operands between the second and third grouped words.

* * * * *